Nov. 23, 1954  N. C. PRICE  2,695,131
SUPERCHARGER

Filed Dec. 2, 1950  2 Sheets-Sheet 1

INVENTOR
NATHAN C. PRICE
BY Henry Gifford Hardy
ATTORNEY

Nov. 23, 1954   N. C. PRICE   2,695,131
SUPERCHARGER
Filed Dec. 2, 1950   2 Sheets-Sheet 2
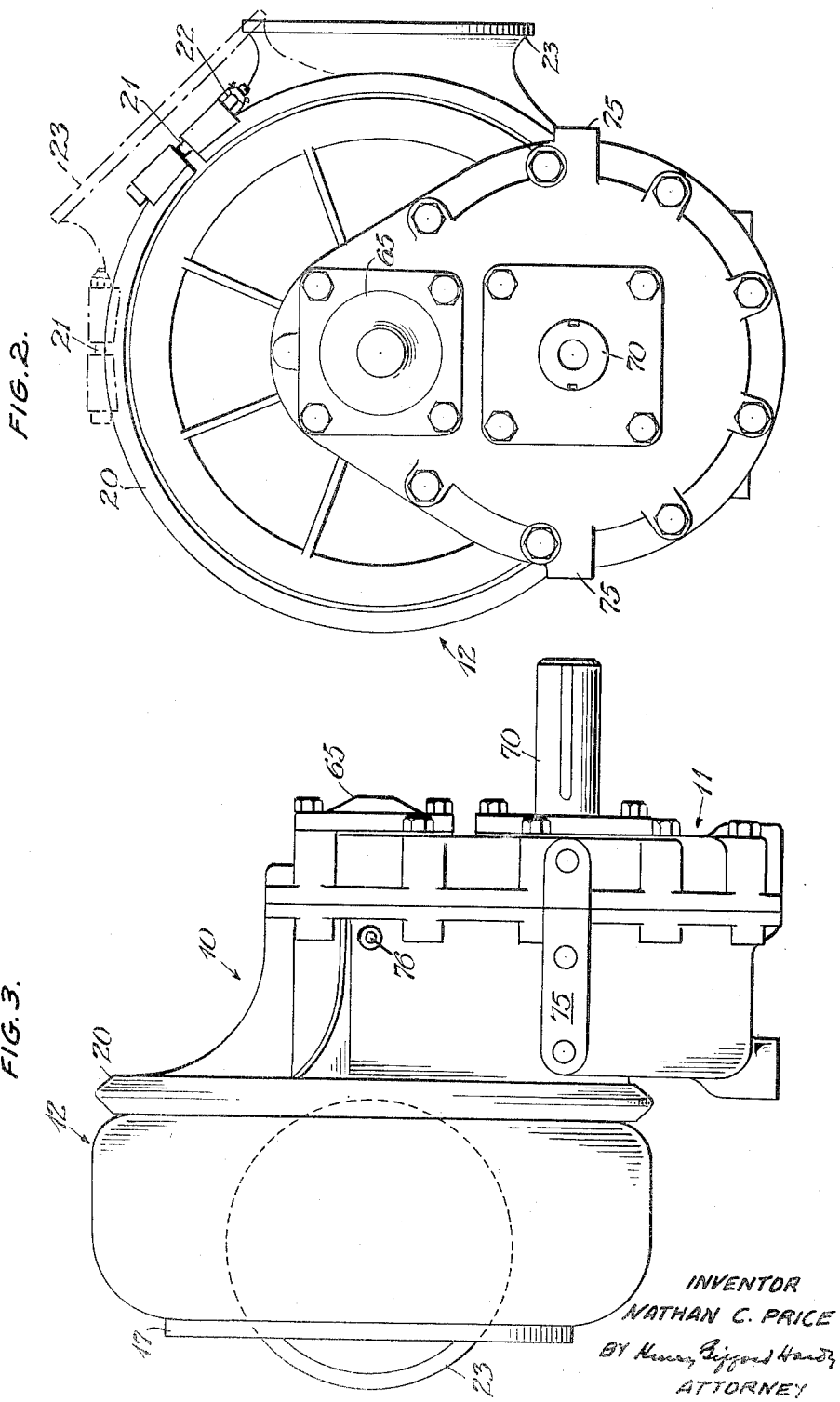
INVENTOR
NATHAN C. PRICE
BY Henry Gifford Hardy
ATTORNEY United States Patent Office 2,695,131
Patented Nov. 23, 1954

2,695,131

SUPERCHARGER

Nathan C. Price, Berkeley, Calif., assignor to Besler Corporation, Emeryville, Calif., a corporation of California Application December 2, 1950, Serial No. 198,810

8 Claims. (Cl. 230—127)

This invention relates to a supercharger or other similar rotary device employing an impeller.

In designing superchargers and other similar rotary machines employing an impeller intended to operate at high speeds, previous practice has been to employ a through-bored and internally splined impeller to furnish a method of attachment to the driving shaft. For example, conventional supercharger impellers are forged of light alloy, machined all over, and furnished with a splined steel busing rivetted or otherwise secured to an axial through-bore of the impeller. This practice greatly increases manufacturing cost and introduces danger of structural failure arising from any undetected, small scratch in the bore, which may act as a stress raiser. It is imperative that an impeller rotating at high speed be dynamically balanced. Both to this end and to avoid structural failure from stress concentration it is necessary to precisely and smoothly machine especially the interior or core of the impeller as well as the exterior surface. An even more objectionable aspect of through-bored or hollow impellers is that the stresses existing at the bore are generally twice greater than those encountered with a solid impeller. Hence, a solid impeller can be safely revolved at a far greater speed, to produce materially increased flow and pressure.

A solid impeller can be manufactured relatively cheaply. Due to the inherent strength of the solid, imperforate construction it can be cast or molded without danger of bursting at high speed and the machining operation is much simpler than the machining of a hollow impeller and in some cases may be completely eliminated, such as by casting the impeller in steel dies. However, the extremely great axial and radial forces acting on a very rapidly rotating impeller are such that slight imperfections in dynamic balance of the impeller, which may be due to the design of the impeller or to its mounting means, have very serious consequences, which are aggravated in the case of a heavy solid impeller. Present means of mounting impellers are such that these unbalancing forces are aggravated and are allowed to cause serious damage. Heretofore, methods of attaching shafts and power transmitting means to solid rotors have, for example, involved cumbersome bolting flanges with spherical bearings for shafts to withstand vibratory misalignment during passage over critical speeds, while approaching the operating speed.

The present invention eliminates such complications and permits a solid rotor or impeller to be attached to its associated power transmitting member, with a resulting critical vibratory speed existing well beyond the normal operating speed range, so that resonant conditions do not occur. Assuming however that the combination of the present invention be overspeeded to a value approaching the bursting strength of the strongest impeller possible to construct, then any incipient vibratory forces encountered will be damped out by minute slippages in the frictional attachment provided.

It is therefore an object of the present invention to provide a novel and improved means of mounting an impeller or other type of rotor.

It is a further object of the present invention to provide a novel and improved means of mounting an impeller intended to rotate at high speeds.

It is a further object of the invention to provide a supercharger employing a solid impeller and provided with mounting means which obviates certain difficulties heretofore encountered.

Yet another object of the invention is to provide a means for mounting an impeller which does not impose a torque on the drive shaft but which employs instead, the principle of an axial clamping or frictional force applied directly to gears and the like.

These and other objects of the invention will be apparent from the ensuing description and the appended claims.

One form which the invention may assume is illustrated by way of example in the accompanying drawings and is described in detail hereinafter.

In the drawings:

Figure 2 is a rear view of the supercharger, as seen from the right of Figure 1.

Figure 3 is a side elevational view of the supercharger of Figure 1.

Figure 1:
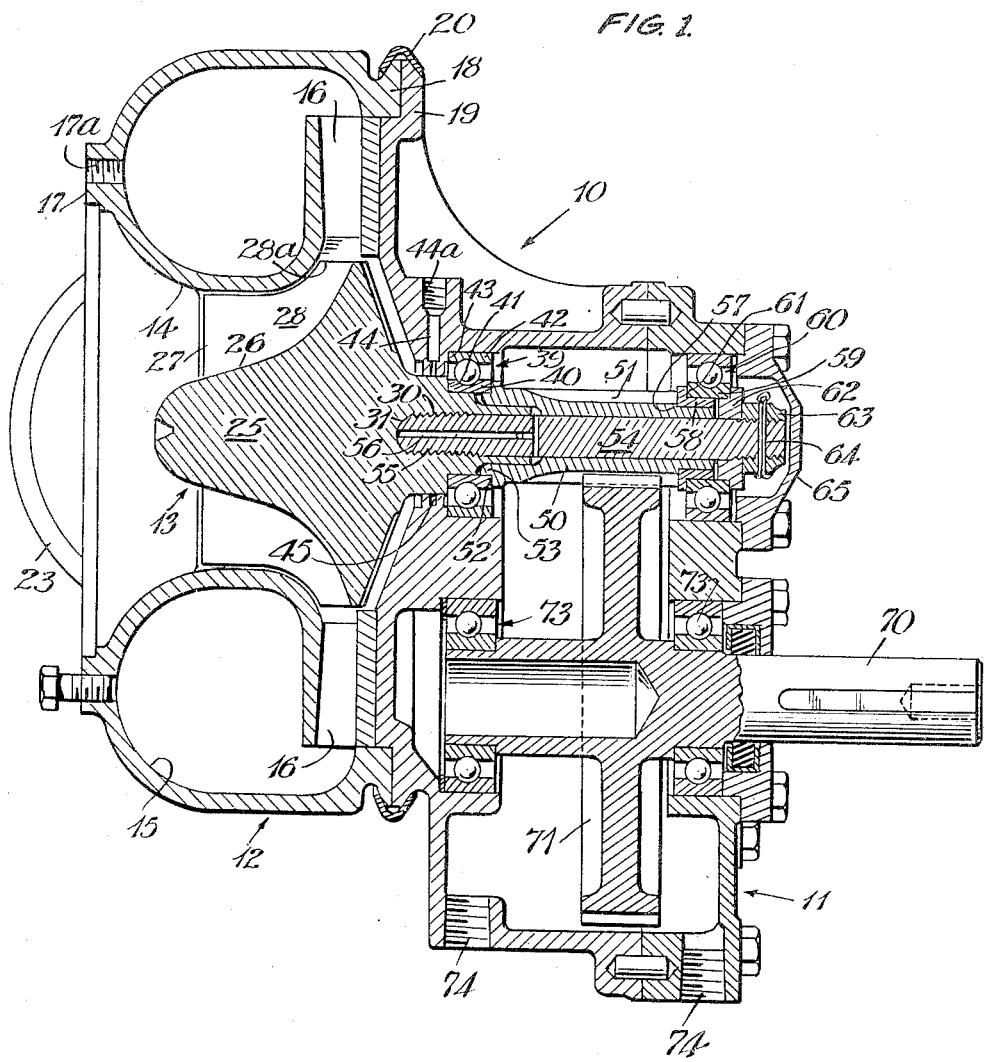
Figure 1 is a longitudinal mid-section through a supercharger employing a solid impeller and the preferred mounting means of the present invention.

Referring now to the drawings, and more particularly to Figure 1 thereof, the supercharger as a whole is designated by the numeral 10, and it comprises a gear housing or gear case 11 for the driving elements of the supercharger, having mounting pads 75, and an impeller housing 12 for the impeller 13. The housing 12 is formed with an axial air inlet passage 14 and is in the form of an annular body providing an annular passage 15 which communicates with the axial passage 14 through radial passages 16. The forward end of the housing 12 is formed with a circular flange 17 which is tapped and threaded at 17a for mounting an air induction pipe. The housing 12 is also formed at its rearward end with a circular flange 18 which is intended to bear against a mating flange 19 formed on the gear housing 11, and the impeller housing 12 is clamped to the gear housing 11 by means of a strap 20, the ends of which are drawn together by means of a bolt 21 and a nut 22. (See Fig. 2.) An air outlet 23 is provided which communicates with the annular passage 15, and it will be apparent that, by loosening the nut 22, the position of the air outlet 23 can be adjusted, and that it can be clamped tightly in adjusted position by tightening the nut 22. This is an advantageous feature because it adapts the supercharger to mounting in various positions and on different types of engines. Two different angular positions of the air outlet 23 are illustrated in Figure 2, one in full lines and the other in broken lines.

The impeller 13 is formed with a solid hub 25 which is rotatably mounted in co-axial relation to the inlet passage 14 by means described hereinafter. The impeller hub 25 is formed with a forwardly tapering surface 26 and with radial vanes 27. Each pair of adjacent vanes 27, together with the hub surface 26 and the annular member 14, defines a rearwardly and outwardly tapering passage 28 having its throat or constricted area at 28a.

At its innermost end and appreciably offset in an axial direction from the major diameter portion of the impeller 13, the impeller hub 25 is tapped and threaded to form a threaded hole 30 having an end portion 31 of spherical form to avoid stress concentration. The impeller 13 is journalled in a ball bearing 39 having an inner race 40 which is held, by means which are described hereinafter, against a shoulder 41 formed on the impeller hub. The bearing 39 also has an outer race 42 which is held against a shoulder 43 formed in the gear housing 11. Adjacent to the ball bearing 39, is provided a vent passage 44 which is threaded at 44a to receive a fitting (not shown), and a pipe thread 45 communicating with the inner end of the passage 44 and with the bearing 39, whereby air under pressure may be introduced between the impeller 13 and the bearing 39 to prevent seepage of oil from the gear case 11 to the housing 12.

For the dual purpose of clamping the impeller against axial thrust and providing a driving connection between the impeller and the driving gear, a pinion sleeve 50 is provided which is formed with teeth 51. The sleeve 50 is formed at its inner or left hand end (as viewed in Figure 1) with a shoulder 52 to bear against the inner race 40 of the bearing 39, and it is also formed with an annular tongue or guide extension 53 which is received in the inner bearing race 40 and registers with the impeller hub 25. To clamp the sleeve 50 against the impeller and to serve as the impeller shaft, a stud 54 is provided which is slidably and rotatably received within the pinion 50 and is threaded at 55 to be received in the threaded hole 30 of the impeller hub. A T-shaped vent passage 56 is provided to prevent entrapment of thread lubricant when the stud 54 is first assembled into the impeller 13. The rounded end 31 of the hole 30 cooperating with the rounded end of the stud 54 serves to reduce stress concentration in the impeller while it is rotating.

At its outer or right hand end (as viewed in Figure 1), the sleeve 50 is formed with a shoulder 57 to receive a collar or washer 58. The inner race 59 of a ball bearing 60 is seated between a shoulder or flange 61 formed on the collar 57, and a washer 62. A pull-up nut 63 is threaded to the outer end of the stud 53 and is locked in place by means of a cotter pin 64.

A removable cover plate 65 is provided which is bolted to the housing 11 and can be removed for access to the pull-up nut 63.

It will be apparent that, by tightening the nut 62, the pinion sleeve 50 will be thrust against the impeller hub 25, thereby firmly clamping it to the impeller and firmly clamping the impeller against axial displacement. A frictional connection is thus provided between the sleeve or pinion 50 and the impeller.

The pinion sleeve 50, and with it the impeller 13, are driven by means of a drive shaft 70 and a driving gear 71 which meshes with the pinion 50. The shaft 70 is journalled in bearings 73. Oil is admitted from an oil pressure source (not shown) to a boss 76 in the side of the housing 11, for lubrication of bearings and gears, and oil vents 74 are provided for draining this oil from the gear housing 11.

It will thus be apparent that a supercharger is provided having several advantageous features. The impeller is of solid construction, thereby reducing manufacturing cost and greatly increasing its strength as compared to impellers of hollow construction. In the present invention the surfaces of the impeller attachment are maintained axially beyond the region of material carrying central loads due to centrifugal force. The impeller can be manufactured economically by molding or casting. Notwithstanding its solid, hence more massive construction, the impeller is so mounted that it can be operated safely at higher speeds than conventional impellers. Thus, the pinion 50 is not keyed to the impeller shaft but is clamped thereto by a frictional, axially directed force. Any extreme vibratory torque developed at high speeds from drive sources cannot, therefore, break the connection between the pinion and the impeller shaft. Nor is it necessary to weld the pinion to, or form it integrally with the impeller shaft. Also, the pull-up nut 62 exerts a uniform axial force throughout an arc of 360° about the axis of the impeller. The inner race of the bearing 39 receives and guides both the impeller and the pinion sleeve, thereby insuring precise registry and radial accuracy of these elements. Moreover, the mounting means is readily accessible and is easily assembled and disassembled whenever the need arises. The described construction can be utilized for rotors having peripheral speeds up to approximately 1900 feet per second, which is about the practical limit for rotors with the best materials available.

An additional advantage is provided by the angular adjustability of the air outlet. As illustrated in the drawings and as explained hereinabove, this outlet is adjustable through an arc of 360°, thus facilitating mounting of the supercharger in engines of various designs.

I claim:

1. A rotary device of the character described comprising a solid rotor with radial vanes and a hub, a bearing for journaling said hub, an axial stud secured within said hub, a pinion slidably and rotatably mounted on said stud with one end enveloping and abutting a portion of said hub and journaled with said hub on the same bearing, a spaced second bearing, and pull-up means at the opposite end of said pinion to clamp the same to said rotor by a frictional force, said pinion end, said pull-up means and said stud being journaled on the same spaced second bearing.

2. A rotary compressor comprising a solid impeller having radial vanes and a hub, a bearing for journaling said hub, a shaft secured axially to said hub, a pinion slidably and rotatably mounted on said shaft, one end enveloping and abutting a portion of said hub and journaled on the same bearing as said hub, a second bearing spaced axially from said bearing, and pull-up means on the opposite end of said pinion to clamp the same to said rotor by frictional engagement, said pinion end, said pull-up means and said shaft being journaled on said second bearing.

3. A high speed compressor comprising a solid impeller having a hub formed with athreaded axial hole ending with a spherical bottom, a stud with a domed head threaded into said impeller coaxially thereof and extending outwardly from the impeller to provide an impeller shaft, a pinion slidably and rotatably mounted on said stud with one end enveloping and abutting a portion of said hub externally, journaling means for rotatably mounting said abutting hub and pinion end, a nut in threaded engagement with the outer end of said stud for exerting an axial thrust on the opposite end of said pinion to clamp it to said impeller and stud, and a second journaling means for rotatably mounting said pinion end, said stud and said nut.

4. A compressor comprising a solid impeller having a hub formed with a threaded axial hole ending with a spherical bottom, air inlet means for admitting air to the impeller, air outlet means for discharging compressed air from the impeller adjustable through an arc of 360°, a gear case, bearing means for mounting said impeller, a stud having a domed head in threaded engagement with and mounted coaxially of said impeller and extending outwardly therefrom, a sleeve having teeth to provide a pinion, said sleeve being slidably and rotatably mounted on said stud and externally enveloping and abutting a portion of said hub at one end, driving means within said gear case for driving said pinion, and a nut threaded to the outer end of said stud for urging said sleeve at its opposite end against said impeller to clamp the sleeve to the impeller by axial thrust.

5. A rotary device of the character described comprising: a solid impeller having a hub and a shaft, spaced inner and outer bearings, each including an inner race and an outer race, for mounting the inner and outer ends, respectively, of said hub and shaft; a pinion sleeve slidably and rotatably mounted on said shaft externally enveloping a portion of said hub and bearing at its inner end against said hub, said hub and inner end being journaled in said inner bearing; and means including a nut threaded to the outer end of said shaft for bearing against the inner race of said outer bearing and exerting an axial thrust on the outer end of said pinion sleeve to clamp the same to said inner bearing and to the impeller.

6. A rotary device of the character described comprising: a solid impeller having a hub formed with a threaded axial hole; an impeller shaft threaded into said hole; spaced inner and outer bearings for the inner and outer ends, respectively, of said hub and shaft, each including an inner race and an outer race; a pinion sleeve slidably and rotatably mounted on said shaft externally enveloping a portion of said hub at its inner end; and means including a nut threaded to the outer end of said shaft and an interposed washer for bearing against the inner race of said outer bearing and the outer end of said pinion sleeve for exerting an axial thrust on said pinion sleeve to clamp the same to the inner race of said inner bearing and to the impeller.

7. A rotary device of the character described comprising a frame, an air inlet and outlet in said frame, said air outlet being adjustable over an arc of 360°, spaced inner and outer bearings supported in said frame and each including an inner race and an outer race, a solid impeller having a hub received within the inner race of said inner bearing, a shaft secured axially to said hub, a pinion sleeve rotatably and slidably mounted on said shaft with one end externally enveloping a portion of said hub and received within the inner race of said inner bearing, and means including a nut threaded to the outer end of said shaft and an interposed washer for bearing on the outer end of said pinion, exerting an axial thrust on the outer bearing and on the pinion sleeve to clamp the latter to the impeller by frictional force.

8. A rotary device of the character described comprising a solid hub having impeller vanes mounted thereon, said hub having a cylindrical projection at one end along the hub's axis of rotation, a pinion sleeve adjacent to said projection and coaxial therewith, said projection and said sleeve having confronting peripheral recesses, a frame, said frame having an air inlet and outlet, releasable band means for adjusting the location of the air outlet over an arc of 360°, a bearing including an outer race and an inner race, said outer race being secured in said frame, said inner race being nested in said recesses for journaling both the projection and the sleeve, a stud threaded in said cylindrical projection and extending through said sleeve's bore, a nut threaded to said stud and a washer engaging the outer end of said sleeve for forcing said sleeve against said inner race and for forcing said inner race against said projection, and an outer bearing secured in said frame for journaling said nut, said stud and said outer sleeve end.

References Cited in the file of this patent

UNITED STATES PATENTS

| Number | Name | Date |
|---|---|---|
| 1,480,436 | Griffin | Jan. 8, 1924 |
| 1,673,151 | Lindemann | June 12, 1928 |
| 1,805,765 | Frederick | May 19, 1931 |
| 1,991,761 | McHugh | Feb. 19, 1935 |
| 1,993,963 | Heinze | Mar. 12, 1935 |
| 2,178,405 | Reggio | Oct. 31, 1939 |
| 2,237,027 | Dorer | Apr. 1, 1941 |
| 2,459,935 | Halford | Jan. 25, 1949 |
| 2,557,134 | Land | Dec. 4, 1951 |

FOREIGN PATENTS

| Number | Country | Date |
|---|---|---|
| 210,906 | Great Britain | Feb. 14, 1924 |